US006869296B2

(12) United States Patent
Van Leest (10) Patent No.: US 6,869,296 B2
(45) Date of Patent: Mar. 22, 2005

(54) CABLE CONNECTION APPARATUS

(75) Inventor: Wilhelmus Van Leest, Rotterdam (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/466,003

(22) PCT Filed: Feb. 12, 2002

(86) PCT No.: PCT/EP02/01558

§ 371 (c)(1),
(2), (4) Date: Jul. 8, 2003

(87) PCT Pub. No.: WO02/069468

PCT Pub. Date: Sep. 6, 2002

(65) Prior Publication Data

US 2004/0063076 A1 Apr. 1, 2004

(30) Foreign Application Priority Data

Feb. 27, 2001 (NL) .............................. 1017454

(51) Int. Cl.[7] .............................................. H01R 13/44
(52) U.S. Cl. ..................................................... 439/131
(58) Field of Search .......................... 439/131; 385/135

(56) References Cited

U.S. PATENT DOCUMENTS 3,646,244 A  2/1972 Cole ........................... 174/57
3,794,956 A  2/1974 Dubreuil ....................... 339/34
5,160,809 A * 11/1992 Yang ............................. 174/48

FOREIGN PATENT DOCUMENTS

| DE | 41 40 701 C1 | 12/1992 |
| GB | 2 277 812 | 11/1994 |

* cited by examiner

Primary Examiner—Neil Abrams
(74) Attorney, Agent, or Firm—Michaelson & Associates; Peter L. Michaelson (57) ABSTRACT

Apparatus for the connection of cables comprises a container into which cables are inserted and a number of nested, hollow-walled cylindrical drums are disposed concentrically relative to a central axis. Each drum is displaceable along the central axis between a first position inside the container and a second position protruding outside the container. Each drum, around its outside circumference, has access apertures behind which connection means have been located, which in the second position are accessible for the connection of inserted cables. Excess cable lengths required for displacement lie wound in hollow-walled spaces of the drums. Drum displacements are preferably accomplished by specific rotations in a direction opposed to the winding direction of the excess cable lengths.

31 Claims, 7 Drawing Sheets

CABLE CONNECTION APPARATUS

BACKGROUND OF THE INVENTION

The present invention is in the field of connecting cables. More in particular it relates to an apparatus for connecting, possibly underground, cables such as copper cables or fibre-optic cables. Apparatus of such a kind are known, for example from references [1] and [2] (for more bibliographic details with regard to the references, see below under C. References). Such apparatus comprises a container buried in the ground which is provided with a cover to close off the top and with passages in or near a base for cables which can be and/or are connected in the container. The container is furthermore completely covered at street level with a cover plate. In the interior of the container is disposed a holder for the connection means such as splicing cassettes for optical fibres or other connector elements to which the conductors of the cables are or can be connected. According to [1], the holder in the container is attached to a withdrawal member by which the holder with the connector elements can be pulled vertically upwards, thus making it accessible above ground for connection work. The excess length of the various cables required for this purpose lies wound loosely as a helix around the holder in the container. According to [2], the holder is in the form of a sort of cable sleeve which is suspended vertically in the container or is attached to a withdrawal member, and into the top of which the cable or cables are sealably inserted. By means of a handle, the cable sleeve can be withdrawn from the container and raised above ground, whereby in this implementation as well the required excess length of the various cables lies wound loosely as a helix around the holder in the container. Such known forms of the apparatus have the drawback that as the number of cables to be connected increases, particularly in the case of different network operators, they become impracticable and inconveniently arranged (reference [1]), or unusable (reference [2]). Moreover, both devices require relatively large reserves of cable, which means that the container cannot be very compact.

Further from reference [3] an apparatus is known, which comprises an assembly of an inner member and an outer member, which are extensible and retractable, for bringing outside and hiding again of an electrical wall socket provided in an outer wall of the inner member. The members are situated cylindrically and concentrically. The cabling of the supply cable for the wall socket, which is introduced into the apparatus from the exterior via an inlet in the outer member, has been arranged in the interior of the apparatus in such a way that the supply cable is connected and interrupted upon extension and retraction of the inner member, respectively. Such an interruption principle has the advantage that the required excess length of the introduced cables in the interior of the apparatus may be limited to minimum. An application for an apparatus, in which the cables should be able to be and to stay connected during a retracted state, is by no means possible.

SUMMARY OF THE INVENTION

An object of the invention is, amongst other things, to provide an apparatus of the kind described above which overcomes the aforementioned drawbacks of the known devices.

According to a first aspect of the invention the apparatus comprises a container provided with at least one inlet for introducing of cables into the container. In the container is situated a cylindrical drum, which is displaceable in a direction parallel to a central axis between a first position in the interior of the container and a second position, in which the drum projects at least partially outside the container. The drum contains connection means for connecting conductors of one or more cables. A cylindrical outer wall of the drum is provided with an access aperture for access to the connection means in said second position of the drum. The drum is double-walled with an inner wall and the cylindrical outer wall, which walls are arranged concentrically relative to the central axis, and the connection means are located in the hollow interspace between the inner and outer wall of the drum. Cables terminated on the connection means run from the at least one inlet through the hollow interspace to the connection means.

The principle of the cylindrical, hollow-walled construction of the drum makes it possible for, depending on the circumference of the drum, a number of cables to be terminated around the inside of the drum, which—when the drum is brought outside—become accessible for making and/or changing (dis)connections. Furthermore, this principle allows the apparatus to be simply expanded by the addition of more drums, which are arranged concentrically, in nested positions relative to one another in the container, and which can be placed, separately or together, in positions projecting outside the container. According to a further aspect of the invention the apparatus comprises at least one further cylindrical drum, similar to and in a nested position relative to the first called drum. The drums are relative to one another and to the container displaceable in the direction of the central axis between a first position in which the drums are situated in the interior of the container, and a second position. In the second position at least one of the drums projects at least partially outside the container and the connections means of the at least one drum are accessible via the access apertures.

To enable a drum to be brought outside the container, extra cable length, hereafter referred to as excess cable length, is needed, which can in principle, if the dimensions of the container and the drums are suitably chosen, be stored in the container beneath the drums. As the number of cables increases, however, this rapidly becomes impracticable.

According to another aspect of the invention, in order to increase the practicability, the apparatus has been arranged such that excess cable length of cables terminated on the connection means of the drum have been contained at least partially in the hollow interspace between the inner- and outerwalls of the drum concerned, when the drum is in the first position. By virtue of this measure, already a better cable arrangement can be realised inside the container.

According to yet another aspect of the invention the apparatus together with the drum or drums contained in the container has been arranged such that, in a first position of a drum, at least part of the excess cable length of the cables lies wound around the cylindrical inner wall of the respective drum. Further guide means are provided which have been arranged such that the displacement of a drum directed substantially along the central axis is combined with a rotation about the central axis. The rotation has a direction which is opposed to the winding direction of the excess cable length during displacement of a drum from the first position to the second or third position. These measures limit the excess length and prevent undesired torsions in the cables during displacements of a drum. The latter is a particularly important consideration in the case of optical cables.

The invention provides a compact apparatus for the connection of cables, the principle of which is applicable to a diverse number of cables and in a wide variety of environments, such as in the ground outside buildings or in the floors, walls or ceilings within buildings. Depending on its application the container and the drums of the apparatus may be manufactured of stainless steel or other suitable metal, or/and of any suitable synthetic materials.

References

[1] Germany DE-C-4140701;
[2] Great Gritain GB-A-2277812;
[3] U.S. Pat. No. 3,794,956.

The references [1],–,[3] have been incorporated by reference in the present application.

BRIEF DESCRIPTION OF THE DRAWING

The invention will now be described in more detail by means of a description of an embodiment, with reference to a drawing which comprises the following figures.

DESCRIPTION OF AN EMBODIMENT

Figure 1:
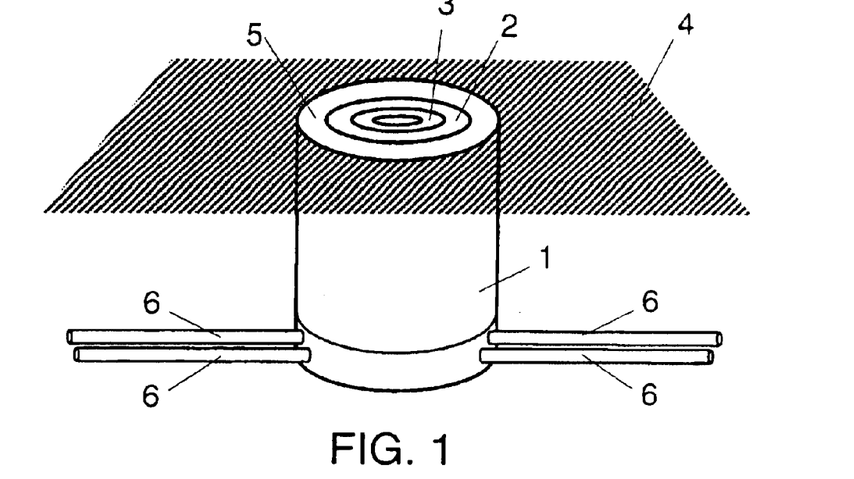
FIG. 1 shows schematically an apparatus according to the invention in a first state.
Figure 2:
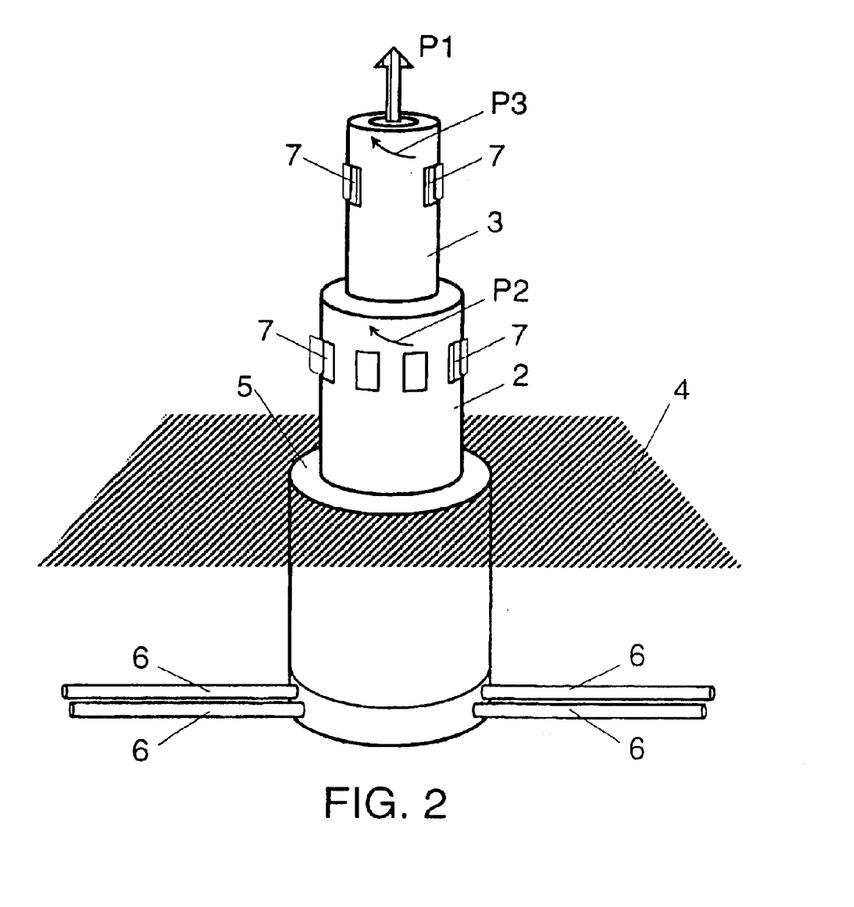
FIG. 2 shows schematically the apparatus of FIG. 1 in a second state.

FIG. 1 and FIG. 2 show schematically an apparatus according to the invention in a first and a second state respectively. The figures show a cylindrical container 1 and concentrically therewith a number of, in the present example two, hollow, cylindrical drums 2 and 3, such that a drum with a smaller diameter, here drum 3, is located inside a drum with a larger diameter, here drum 2. In the first state the drums 2 and 3 are in nested positions, inside the container 1. In the present embodiment the container is positioned underground, i.e. buried, built in or otherwise installed. For the sake of simplicity, "underground" will hereafter be understood to mean, unless stated otherwise, a position or positioning beneath every form of ground level, floor level or street level 4, whether in the open field, in built-up areas or in buildings, while "above ground" indicates a position or positioning above such a level. A top 5 of the container extends, at least approximately, to the level 4. Underground, one or more cables 6 are introduced into the container. In the interior of each of the drums are arranged connection means (see FIG. 3 et seq.), such as connector panels, on which the cables 6 introduced inside are terminated. Each of the drums is provided on the outside with access apertures 7, optionally sealable by a flap or door, behind which apertures the connection means are positioned in the hollow interior of the drum in question. The drums 2 and 3 are incorporated in the container 1 such that by exerting a pulling or pushing force with the aid of suitably positioned pulling or pushing means (not drawn), outside or inside the container respectively, according to arrow $P_1$ in a substantially vertical direction, on one of the drums, preferably the middle one, here drum 3, these drums are as it were telescopically extensible and can in this way be displaced to an above-ground position. This is the state of the apparatus shown in FIG. 2. For telescopic extensibility, it is not necessary for the drums to be cylindrical. Instead of a cylindrical outer wall, the drums can be constructed with one or more flat side walls substantially parallel to the direction of displacement, which side walls are provided with the access apertures. A cylindrical outer wall, however, eases rotation of the drums around the central axis, which preferably accompanies displacements of the drums, as will be described hereafter. Such rotations are indicated in FIG. 2 by arrows $P_2$ and $P_3$. The apparatus can also adopt other states, such as those in which only the drum 2 or the drum 3 is extended to an above-ground position. In an above-ground position, such a drum with its access apertures 7 is accessible for work on the connection means mounted behind the apertures. After the work has been performed, the drums can, depending on the chosen pulling or pushing means, be pushed or pulled, or alternatively allowed to fall back under their own weight, to their original underground position.

It is pointed out that, depending on the desired working height, the container can of course also be positioned partly above ground. It is furthermore pointed out that the application of the apparatus is not limited to situations with a horizontal level 4. Situations are in principle also possible in which the level 4 is slanting or makes a right angle with the horizontal, such as for example if the apparatus is built into a wall of an above-ground or underground space, or is even positioned upside down, as would be the case if the apparatus is built into a ceiling of such a space.

Figure 3:
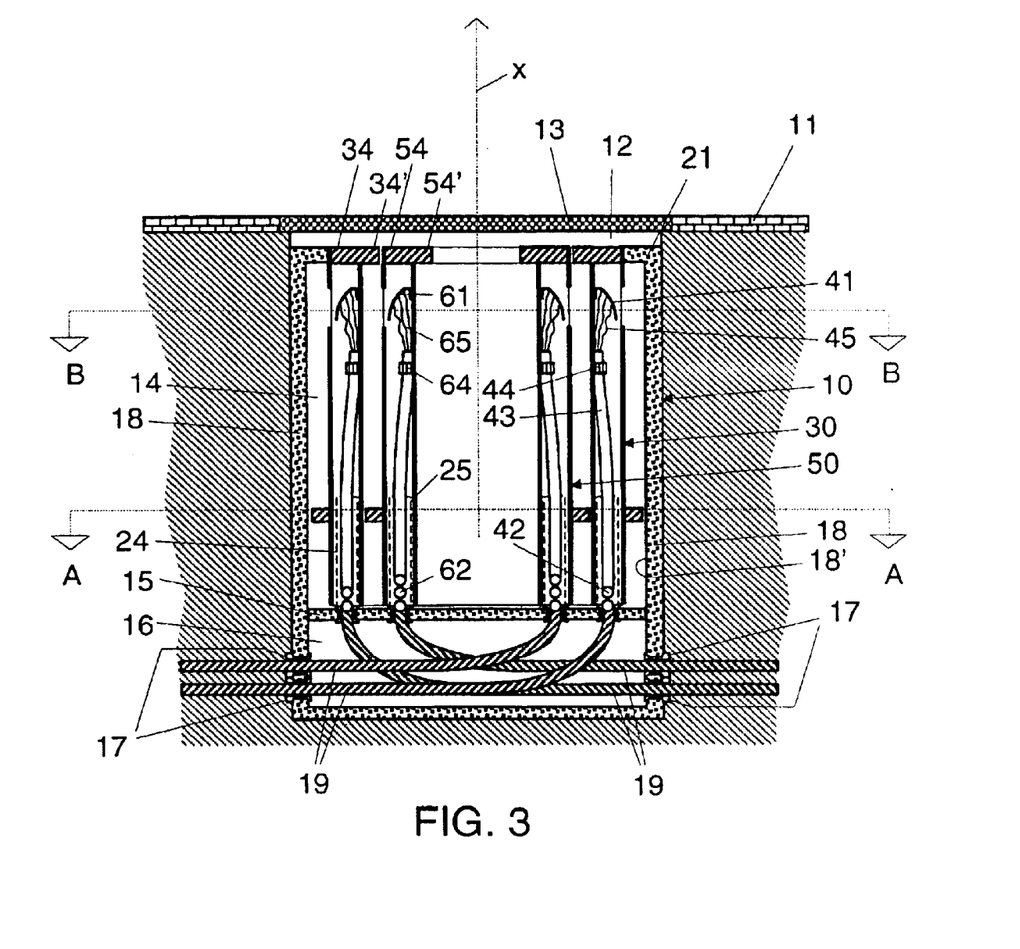
FIG. 3 shows schematically in a vertical cross section an apparatus according to the invention in greater detail, in a state corresponding with FIG. 1.
Figure 4:
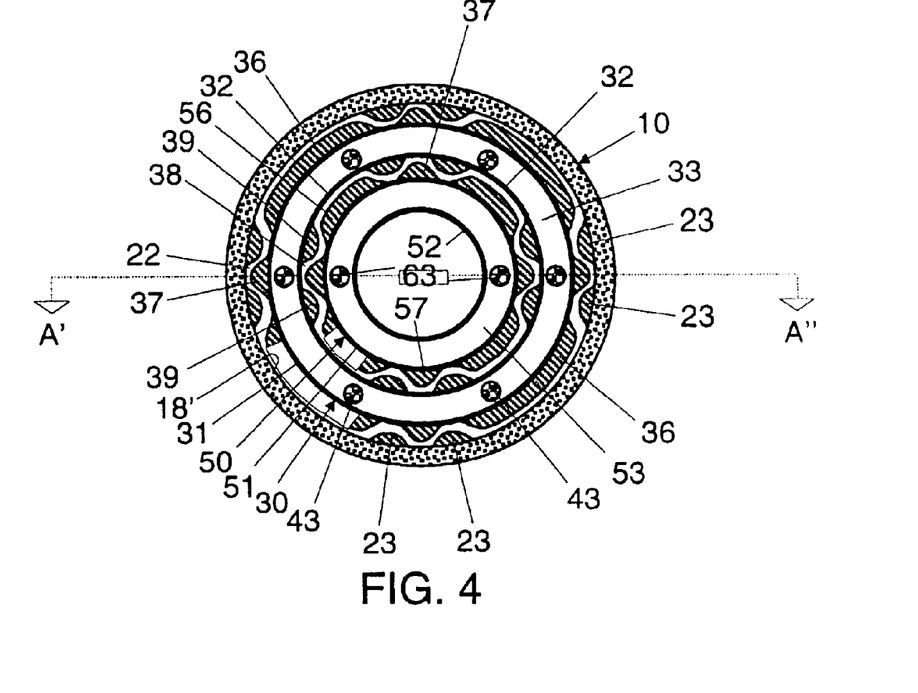
FIG. 4 shows schematically a horizontal cross section according to the line A—A of the apparatus of FIG. 3.
Figure 5:
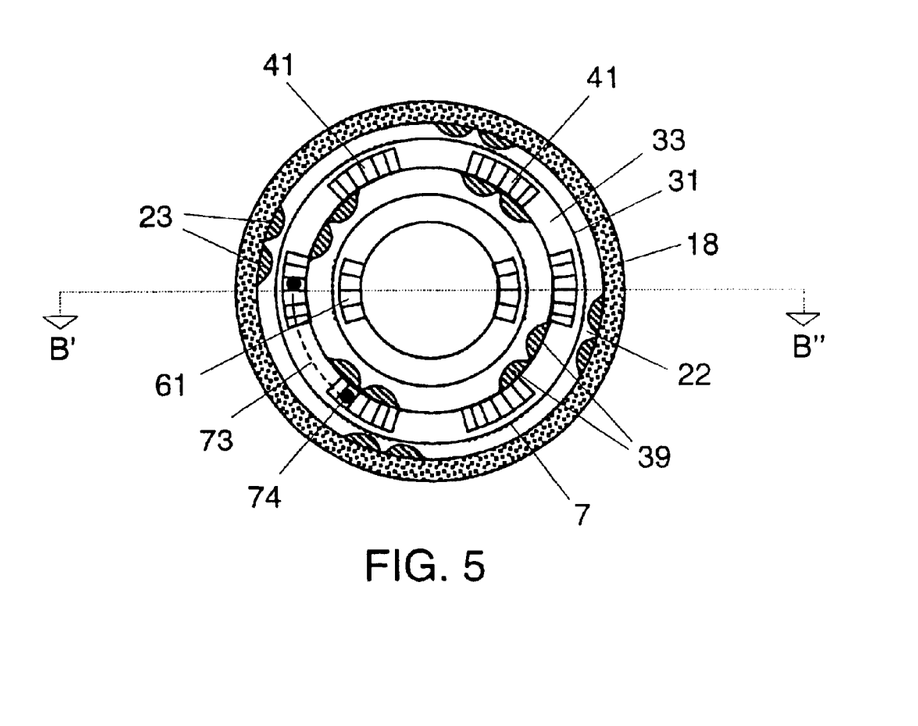
FIG. 5 shows schematically a horizontal cross section according to the line B—B of the apparatus of FIG. 3.
Figure 6:
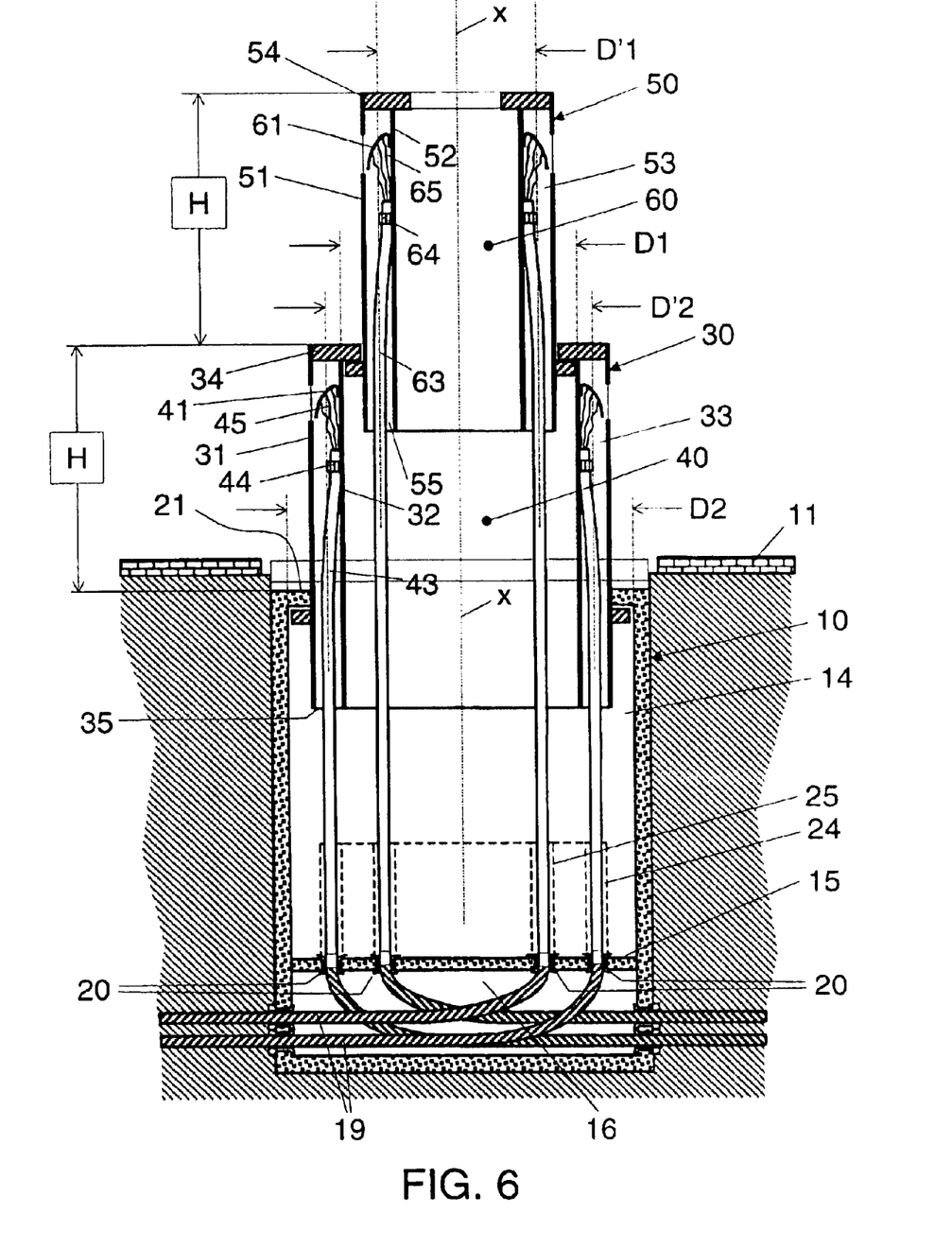
FIG. 6 shows schematically in a vertical cross section the apparatus of FIG. 3, in a state corresponding with FIG. 2.

An embodiment of the apparatus will now be described in more detail in an application for the connection of underground cables, wherein the connection means used for making or changing (dis)connections can be brought above ground. To this end, FIG. 3 and FIG. 6 show schematically a vertical cross section of the apparatus in states corresponding with FIG. 1 and FIG. 2 respectively, and FIG. 4 and FIG. 5 show schematically a horizontal cross section of the apparatus according to the lines A—A and B—B respectively in FIG. 3. The figures show the apparatus comprising a container 10 buried in the ground below street level 11, within which container a first cylindrical drum 30 and a second cylindrical drum 50 are disposed concentrically relative to a central axis x. In closed state as shown in FIG. 3 the container 10 is closed off by a cover 12. A cover plate 13 hides the container 10 from view. The container 10 consists of a first compartment 14, in which the drums are located, and a second compartment 16 separated from the first compartment by a dividing wall 15, into which second compartment cables 19 are introduced into the container 10 via inlets 17 in a wall 18 of the container. The wall 18 has, at least in the second compartment, a cylindrical inner wall 18'. The drums 30 and 50 are double-walled hollow cylinders, each with an outer wall 31 and 51 respectively and an inner wall 32 and 52 respectively, between which are hollow interspaces 33 and 53, and each with a central hollow space enclosed by the respective inner wall 40 and 60 respectively. The hollow interspaces 33 and 53 are closed off at the top by rings 34 and 54 respectively. The outside diameters of the rings 34 and 54 correspond with the outside diameters of the outer walls 31 and 51 respectively of the drums, while the inside diameters of the rings are smaller than the diameters of the inner walls 32 and 52 of the drums, so that overhanging edges 34' and 54' are formed. The top of the container also has such an overhanging annular edge 21 with an inside diameter preferably such that during displacement the drum 30 with its outer wall 31 can slide smoothly through it and can simultaneously perform a rotation around the central axis x. In such a way, the inside diameter of the ring 34, i.e. of the overhanging edge 34', is preferably such that during displacement the drum 50 with its outer wall 51 can slide smoothly through it, and simultaneously rotate. The diameter of the ring of the drum with the smallest diameter, here ring 54 of drum 50, can optionally be chosen to be zero, in which case the central hollow space 60 of the drum 50 is closed off at the top. In the state in which the drums 30 and 50 are located inside the container, the rings 34 and 35 and the edge 21 preferably lie in the same plane. The hollow interspaces 33 and 53 are open at the bottom with annular openings 35 and 55. The length/height of the drums is chosen such that in retracted state, as shown in FIG. 3, the drums rest with the bottom of their respective inner and outer walls on the dividing wall 15, as a result of which the dividing wall bears against the annular openings 35 and 55 and can close off these openings at the bottom. Where the dividing wall 15 bears against the annular openings 35 and 55, it is provided with passages 20 for the (individual) feeding through of cables 19 from the second compartment 16 to the first compartment 14 of the container, directly into the hollow interspaces 33 and 53. Connection means, such as connector panels, 41 in drum 30 and 61 in drum 50, are mounted all around in the hollow interspaces, preferably on the inner wall of the respective drum (as drawn; attachment on the inside of the outer wall is also possible). Each fed-through cable 19 has a suitably chosen excess length which differs according to the drum in which the respective cable is terminated. A cable terminated in the hollow interspace 33 (53) of drum 30 (50) has an excess length 42 (62) and is fastened at one end 43 (63) by attachment means 44 (64), for example at the inner wall 32 (52), in the vicinity of, preferably just below (as drawn), the connection means 41 (61) onto which conductors 45 (65) of the respective cable are or can be terminated. The excess cable lengths 42 (62) of the fed-through cables 19 lie in the hollow interspace 33 (53) wound around the cylindrical inner wall 32 (52) of the drum 30 (50) with the same winding direction. The cylindrical outer walls 31 and 51 of the drums 30 and 50 are provided all around their outside with flanged protective edges 36 and 56 respectively. The protective edges 36 and 56 on the outer walls have outside diameters which are preferably only a little smaller than the inside diameters of the inner walls 18' and 32 in order to promote the sliding displacement of the drums and are located at a suitably chosen distance H from the rings 34 and 54 respectively. If the drums are moved in a direction parallel to the central axis x, the maximum distance (here the height) over which the drums can be moved is limited by the blocking engagement of the protective edge 36 with the overhanging edge 21 of the container for drum 30, and of the protective edge 56 and the overhanging edge 34 of the drum for drum 50. The construction of the various parts of the drums, and in particular of the elements cooperating in the aforesaid blocking engagement, is preferably such that if the drum 50 is displaced over a distance greater than H to a position outside the container by the exertion of a pulling or pushing force, the drum 50 will also pull the drum 30 outside the container, which is referred to above as telescopic extensibility. If such telescopic extensibility can also be combined with rotations of the drums about the central axis x in a direction opposed to the winding direction of the excess cable lengths in the drums, then—at least in principle—the minimum required excess length of the cables, terminated in a given drum, is equal to the length of the maximum displacement distance of that drum, in this case excess length 42 with length H for each cable in drum 30 and excess length 62 with length 2H for each cable in drum 50. With such minimum lengths for the excess cable lengths 42 and 62 respectively, the cable ends 43 and 63 will, when the drums are extended to their maximum, i.e. the state as shown in FIG. 6, extend tautly between the passages 20 in the dividing wall 15 and the attachment means 44 and 64 respectively. Preferably, for reasons to be set out below, the excess lengths will be chosen to be somewhat longer. Since each cable end 43 (63) is attached by attachment means 44 (64) to the inner wall of a respective drum, the rotation of a drum required for the unwinding of the excess cable length can in principle be the result of reaction forces in the cable ends which are generated during the pulling or pushing forces exercised on the respective drum in order to displace the drum. Preferably, however, guide means are provided, which on the one hand keep the lengths of the excess cable lengths 42, and 62 within reasonable limits and on the other hand avoid undesired pulling and pushing forces in the cable ends, in particular for fibre-optic cables. Such guide means can be implemented in various ways, such as for example by means of projections 37 and 57 recessed in the protective edges 36 and 56 respectively, which during displacement of the drums are forced to follow grooves 22 and 38, which are formed by pairs of parallel ridges 23 and 39 provided on the inner walls 18' and 32. The number of projections 37 and 57 and the corresponding number of grooves, in this example four, are preferably distributed at regular intervals around the central axis, for example in the form of screw thread. In order to prevent the above-mentioned undesired pulling and pushing forces in the cable ends, the grooves should follow a specific path (see below).

Figure 7:
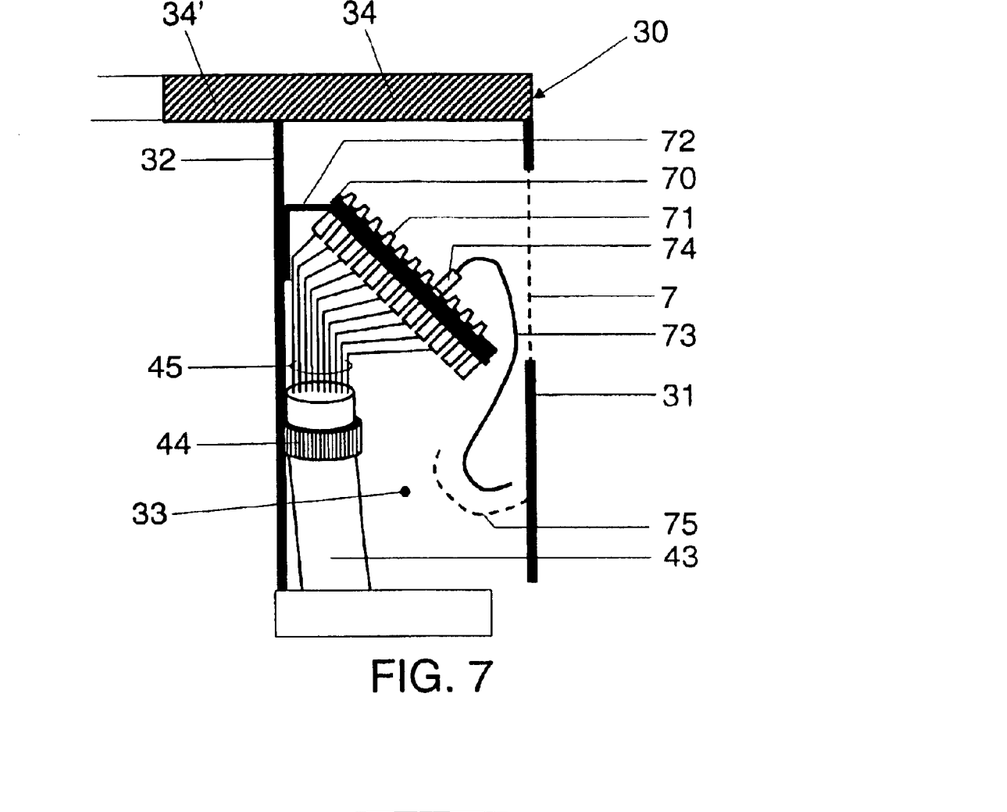
FIG. 7 shows schematically in a cross section a detail of a drum of the apparatus according to FIGS. 3 and 6.
Figure 8:
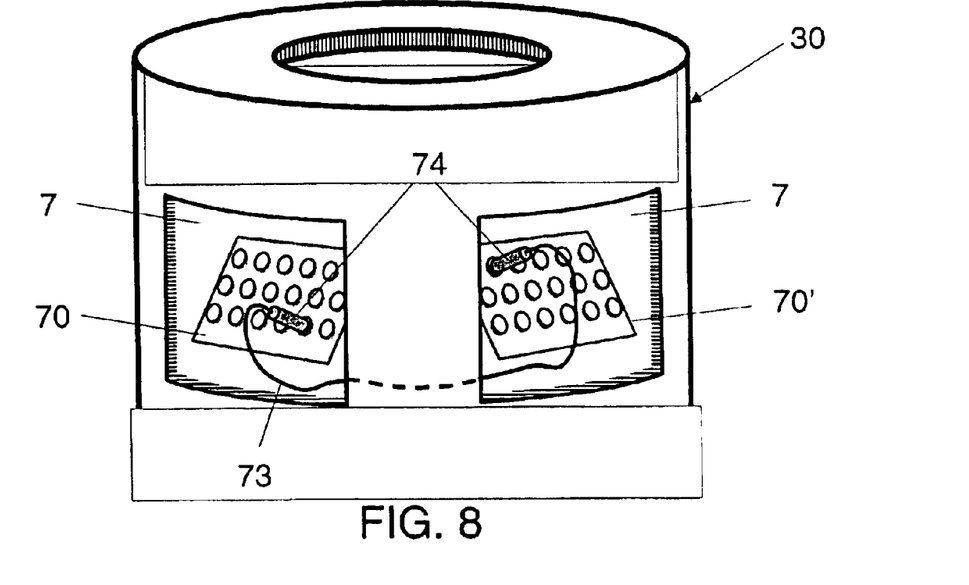
FIG. 8 shows schematically in a spatial view another detail of a drum of the apparatus according to FIGS. 3 and 6.

FIG. 7 shows in a cross section a detail of a drum, here drum 30, at a height such as to show the connection means mounted in the drum. A connector panel 70, also called a patch panel, with a number of connectors 71 is mounted inside the hollow interspace 33 by means of a mounting bracket 72 against the cylindrical inner wall 32, above the place at which a cable end 43 with attachment means 44 is attached at the same inner wall 32. Cable conductors 45 are individually terminated at the bottom of the panel 70 on the connectors 71. In order to improve the accessibility of the panel bottom for termination, the panel is preferably removable or pivotally mounted against the inner wall. At the top of the panel connections can be made with the aid of so-called patch cords 73 of suitable length, which are provided at both ends with coupling connectors 74, between connectors on the same connector panel 70 or on another similar connector panel 70' also mounted on the inner wall 32 of the same drum. This is shown in FIG. 8 in a spatial view of a detail of the drum 30. The patch cords can hang loosely in the hollow interspace, but can also be bundled and fed through a troughing 75 provided around the inside of the outer wall 31. By choosing suitable connectors, either electrical or optical, such connector panels can be designed to accommodate conductors of copper cables and fibre-optic cables, thus making the apparatus applicable for a broad spectrum of energy and signal transmission cables, not only separately but also simultaneously. In the latter case, only connectors of the same type can in principle be connected to one another, unless patch cords or also connectors incorporating electro-optical converters can be employed. Instead of by the use of patch cords, the connections on a connector panel or between two connector panels can also be made with the aid of fixed wiring, which is connected via switching means controllable by an electronic switch panel in order to make the desired (dis)connections.

Figure 9:
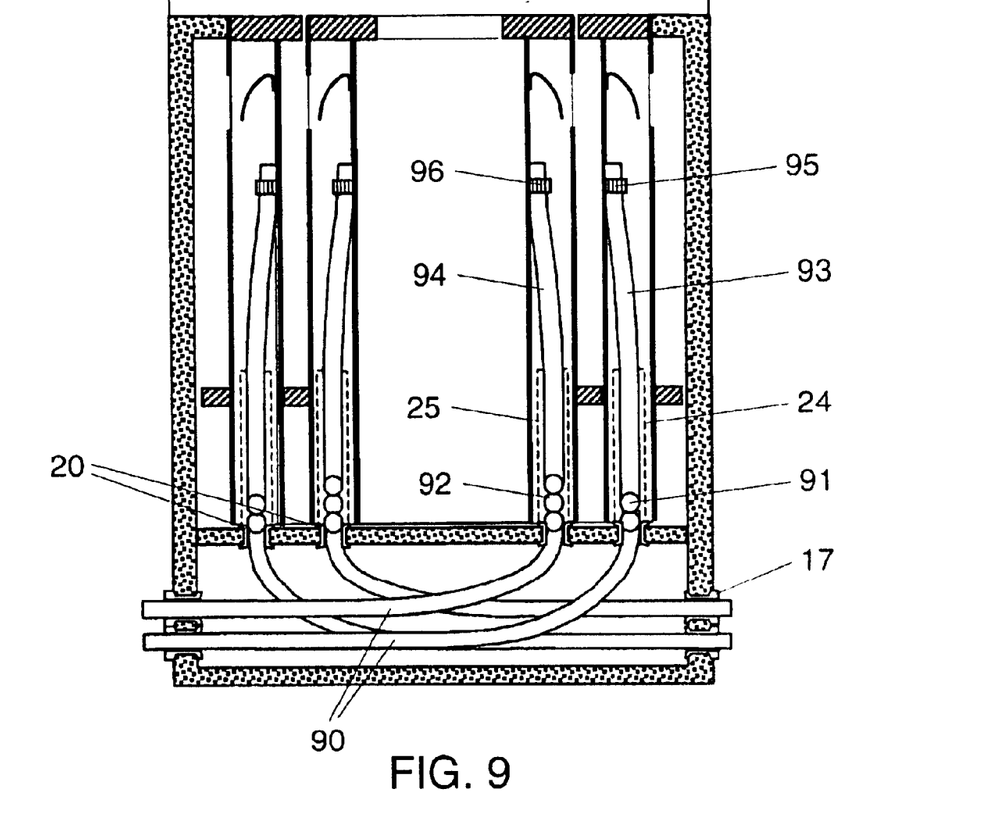
FIG. 9 shows schematically in a vertical cross section a variant of the apparatus.

FIG. 9 shows a variant of the apparatus, wherein the container is provided with cable guide tubes 90, through which the cables 19 to be terminated on the connection means are led from the inlets 17 via the passages 20 to the respective connection means 45 and 65 in the hollow interspaces 33 and 53 of the drums 30 and 50 respectively. In a similar way as for the cables 19 in FIG. 3, the guide, tubes 90 with excess tube lengths 91 and 92 lie wound in the hollow interspaces 33 and 53 respectively of the drums 30 and 50, while their tube ends 93 and 94 are attached with attachment means 95 and 96 to the respective inner walls 32 and 52 of the drums. The minimum lengths of the excess tube lengths 91 and 92 correspond with those of the cables. The guide tubes must be flexible and resilient in order not to hinder the unwinding and winding up of the cables in the guide tubes during displacement of the drums. At the inlets 17 of the container, the guide tubes 90 are preferably provided with tube coupling elements 97 for coupling with external cable guide tubes, so that cables to be terminated in the container are fed from an external tube system to the inside, for example with the aid of the customary cable blowing techniques.

Figure 10:
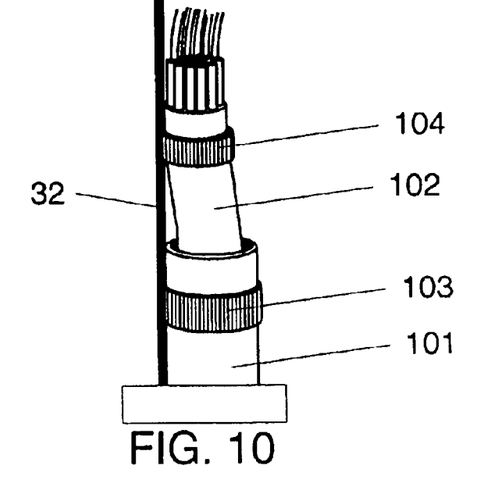
FIG. 10 shows in a cross section yet another detail of a drum of the apparatus according to FIG. 9.

FIG. 10 shows, in an analogous manner as FIG. 7, how a tube end 101 and a cable end 102 disposed therein are attached with attachment means 103 and 104 respectively to the inner wall 32 of drum 30.

Figure 11:
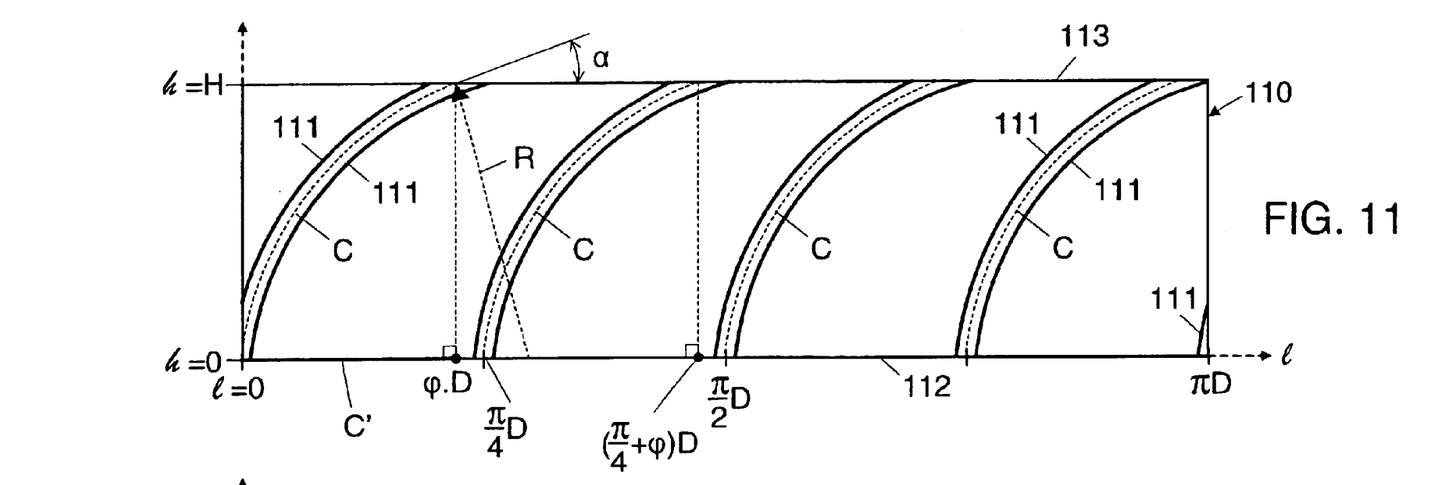
FIG. 11 shows schematically a cylindrical surface rolled out to form a flat surface in illustration of a specific path for the movement undergone by a drum in a preferred embodiment of the apparatus during displacement.
Figure 12:
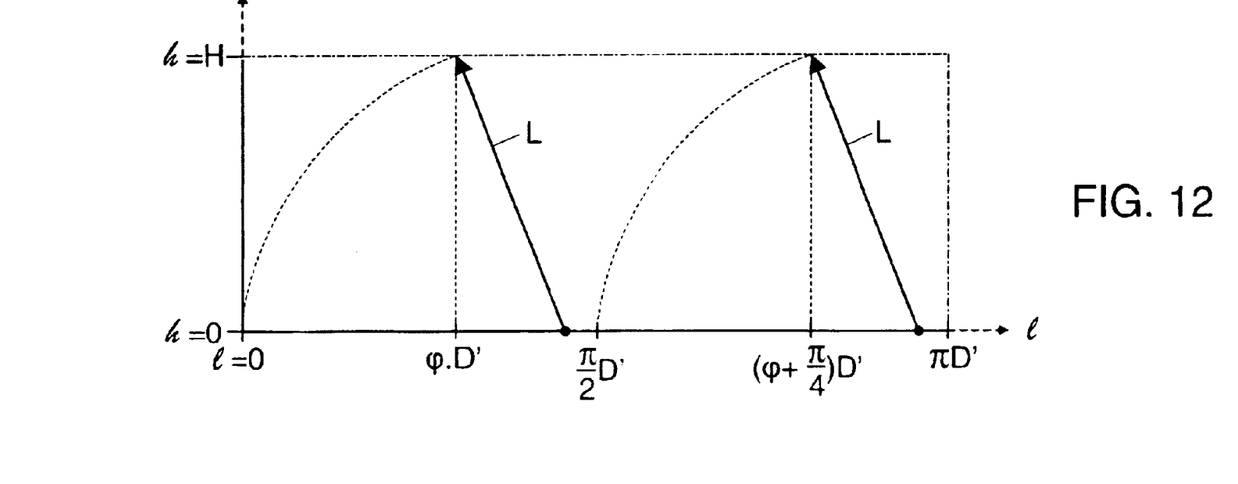
FIG. 12 shows, in an analogous manner as FIG. 12, a cylindrical surface rolled out to form a flat surface in order to determine the amount of excess length of cable or tube required for the displacement of a drum.

The specific path followed by grooves such as grooves 22 and 38 will now be explained in more detail with reference to FIG. 11 and FIG. 12. FIG. 11 shows schematically a relevant part of a view of a cylindrical inner wall with diameter D, such as the inner wall 186 of the container 10 or the inner wall 32 of the drum 30, rolled out flat to form a rectangle 110 with a height h=H and length l=πD. H corresponds with the maximum height, or distance, over which one drum, here drum 30, can be moved relative to the container or drum 50 relative to the drum 30 directly surrounding it, as shown in FIG. 6. The length l=πD corresponds to the circumference of the cylindrical inner wall. At equal horizontal intervals of ¼πD are located grooves formed by pairs of ridges 111, corresponding with the above indicated ridges 23 and 39, and grooves 22 and 38 on the inner walls 18' and 32 respectively. The path of such a groove is, seen in the flat surface, an arc c with radius R≧H, which at height h=0 makes a right angle with the cylinder circumference 112 of the inner wall, and at height h=H makes an angle α≧0 with cylinder circumference 113. The projection c' of the arc c on the cylinder circumference 112 has a length l=φ·D, where φ is the angle in radians through which a drum rotates during displacement out of the container over a height h=H. For the radius R of the arc, which for a given maximum displacement height H per drum is a function of the angle φ and the diameter D of the inner wall with the grooves, the following expression holds:

$$R(\varphi, D) = \frac{1}{2}\varphi \cdot D\left\{1 + \left(\frac{H}{\varphi \cdot D}\right)^2\right\} \qquad \{1\}$$

And for the angle α:

$$\cos\alpha = H/R \qquad \{2\}.$$

During such a displacement, the projections of the protective edge of a drum, such as projections 37 or 57 on drum 30 or 50 respectively, follow such arc-shaped grooves, causing the drum to rotate and with it each rigidly coupled part, such as the attachment means 44 or 64 in the case of a cable end and 95 or 96 in the case of a tube end, in the drum over the angle φ. It is pointed out that what is described below for cable ends also holds mutatis mutandis for tube ends. If the cable ends lying in the hollow interspace of a drum are wound with an average diameter D'<D, the minimum length of the excess cable length which is needed for such a displacement to assure undisturbed unwinding of the excess cable length, can be determined from formula [1], with L=R(φ,D'). This is schematically shown in FIG. 12 for two cable ends such as in drum 50.

On the inner walls 32 and 18' of the drum 30 and the container 18 respectively, the grooves are preferably configured such that the paths of the grooves for the inner wall rolled out flat, as shown in FIG. 11, follow identical arcs c with a projection c' on the cylinder circumference 92 of the same length. Since the diameters of these inner walls 32 and 18', indicated by $D_1$ and $D_2$ respectively, differ, however ($D_1<D_2$), the angles $\phi_1$ and $\phi_2$, over which the drums 30 and 50 rotate during displacement to h=H also differ, as given by $\phi_1 \cdot D_1 = \phi_2 \cdot D_2$. In the hollow interspaces 53 and 33 lie the excess lengths 62 and 42 in the retracted state (FIG. 3) with diameters $D_1'<D_1$ and $D_2'<D_2$ respectively. This means that for the displacement of drum 50 relative to the container 18 over a distance H, the excess cable length 62 of each of the cables in that drum must in the first instance have a minimum length $L_{11}=R(\phi_1, D_1')$, while the cables in drum 30 must have for its displacement over the distance H an excess cable length 42 with a minimum length $L_2=R(\phi_2,D_2')$. For the cable ends in the drum 50, the minimum length $L_{11}=R(\phi_1,D_1')$ is, however, not enough. If the drum 50 is pulled or pushed further out of the container, so that for this drum h>H, drum 30 will also be pulled outside to a maximum distance h=H for drum 30 and distance h=2H for drum 50. The drum 50 is therefore, as it were, rigidly coupled to the drum 30 and fully undergoes the rotation over the angle $\phi_2$ of the drum 30. The cable ends in the drum 50 therefore need an extra excess cable length with a minimum length $L_{12}=R(\phi_2,D_1')$. In total, therefore, each cable end in drum 50 needs to have an excess cable length with a minimum length $L_1=L_{11}+L_{12}=R(\phi_1,D_1')+R(\phi_2,D_1')$.

In principle, the radius R can be chosen to be equal to the distance H, so that the angle α=0. Preferably, however, the angle α>0, for example α≧30°, as a result of which the required rotations need little or no extra support during the displacements of the drums to the outside and then back inside. On the other hand, a greater minimum length is needed for the excess cable length. A quantitative example will show that for α=30° the length of the required excess cable is still within reasonable limits:

H=60 cm and α=30°→R=69.2 cm
$D_1$=66 cm and $D_1'$=50 cm→$\phi_1$=0.594 rad
$D_2$=96 cm and $D_2'$=80 cm→$\phi_2$=0.408 rad.
For the minimum length of the excess length of the cables in drum 50 it is then found:

$$L_1 = L_{11} + L_{12}$$
$$= R(\varphi_1, D_1') + R(\varphi_2, D_1')$$
$$= 75.5 + 98.4 = 173.9 \text{ cm}$$

and for that of the cables in drum 30:

$$L_2 = R(\phi_2, D_2') = 71.5 \text{ cm}.$$

This shows that the calculated $L_1$ is relatively only a little greater than one winding (173.9 cm vs $\pi D_1'$=157.1 cm), and $L_2$ is only a little greater than a quarter of a winding (71.5 vs ¼$\pi D_2'$=62.8 cm).

The above calculation described on the basis of formulae {1} and {2} for the determination of the "minimum" required length for the excess cable lengths in a drum only holds for the case that the attachment means are provided at the bottom of the drum near the dividing wall 15, and therefore offers a theoretical approach. In practice, the attachment means are provided higher in the drums, possibly just beneath the connector panels, and, as already indicated, preferably a>0 is chosen. Taking this approach as a guide, and applying the thus obtained 'minimum' lengths for the excess cable, has the advantage that during each displacement and in any extended state, in particular for vertical application of the apparatus, the cable ends can always hang loosely in the drums between the attachment means and the passages in the dividing wall. Consequently, the cable guidance for the unwinding and subsequent winding up of the excess cable lengths during the displacement of the drums can be further improved by providing hollow-walled cylindrical rings 24 and 25 (shown dotted in the FIGS. 3, 6 and 9) in the container, each consisting of a cylindrical inner and outer wall, concentric with the central axis x. The ring 24 (25) is attached at the bottom with its inner and outer wall to the dividing wall 15, and extends, in retracted state from the drums, with an open top inside the hollow interspace 33 (53) of drum 30 (50) up to a height below the attachment means, viz. 44 (64) in FIG. 3 and 95 (96) in FIG. 9. In this state the excess lengths, excess cable lengths 42 and 62 in FIG. 3, and excess tube lengths 91 and 92 in FIG. 9, lie within the hollow-walled rings 24 and 25. The internal thickness of the hollow-walled rings is greater than the thickness of the thickest cable or guide tube employed, and smaller than twice this thickness, but preferably one and a half times this thickness. The height of the hollow-walled rings can differ from one drum to another, for example depending on the minimum excess length determined for a drum.

If the container is suitably dimensioned, additional excess cable length can optionally be held in reserve in the first compartment and/or in the second compartment, preferably in the hollow-walled rings.

Depending on the environment of the application, the inlets and/or passages 17 and 20 are provided with sealing rings to prevent the ingress of undesired substances from the environment.

There are various possibilities for achieving the pushing and/or pulling forces required to move the drums to the outside and back inside again, depending on the weight and size of the apparatus. For small and lightweight drums, externally applied manpower may be sufficient. For larger and heavier apparatus, however, drawing or hoisting means may be applied, for example from an engineer's vehicle, which engage on the upper ring of the inner drum. This upper ring can be provided for this purpose with one or more pulling rings. For the internal pushing-up of the drums, use can be made of, for example, an electromechanical or pneumatic lifting jack or telescopically extensible rod mechanism located in the central hollow space of the inner drum between the dividing wall of the container and the upper ring of the inner drum.

Since the direction of the effect of gravity on the excess cable length, in case the apparatus is built in ceilings, is reversed with respect to cases in which the apparatus is built in ground or bottom, each drum should preferably be provided with supporting means, e.g. an annular cross-plate, on which the excess cable length can lie, if the respective drum is in retracted state. Such supporting means should be located in the hollow interspace of the drum near the attachment means 44, 64 or 96.

What is claimed is:

1. Apparatus for the connection of cables the apparatus comprising:
    a container having at least one inlet for the introduction of cables into the container,
    a first cylindrical drum displaceable in a direction parallel to a central axis (x) between a first position in the interior of the container and a second position in which the first drum projects at least partly outside the container, and
    connection means, located in the first drum, for the connection of conductors of at least one of the cables, a cylindrical outer wall of the first drum being provided with one or more access apertures for access to the connection means in said second position, and
    wherein the first drum is double-walled with an inner wall and the cylindrical outer wall, which walls are arranged concentrically relative to the central axis, and that the connection means are located in a hollow interspace between the inner and outer walls of the first drum, cables terminated on the connection means being led from the said one inlet via the hollow interspace to the connection means.

2. The apparatus according to claim 1 wherein the apparatus comprises at least one further cylindrical drum similar to and in a nested position with the first drum, said first and further drums are displaceable relative to one another and relative to the container in a direction of the central axis between a first position in which the first and further drums lie in the interior of the container and a second position in which at least one of the first and further drums projects at least partly outside the container, with the connection means of said one drum being accessible via said one of the access apertures.

3. The apparatus according to claim 2 wherein the first and further drums are displaceable relative to one another and relative to the container in the direction of the central axis between the first position and a third position, in which third position a drum of said first and further drums having a smaller cylinder diameter than other ones of the first and further drums projects at least partly outside a drum with a larger cylinder diameter than other ones of the first and further drums, and the drum having the larger cylinder diameter projects outside the container, with the connection means of both the drum with the smaller cylinder diameter and the drum with the larger cylinder diameter being accessible via respective ones of the access apertures.

4. The apparatus according to claim 1 wherein excess length of cables terminated on the connection means of the first drum lies in the hollow interspace between the inner and outer walls of the first drum when said first drum occupies the first position.

5. The apparatus according to claim 4 wherein in the first position of the first drum at least part of the excess length of the cables lies wound around the cylindrical inner wall of the first drum, and guide means are provided which have been arranged such that the displacement of the first drum directed substantially along the central axis is combined with a rotation about the central axis, said rotation having a direction which is opposed to the winding direction of the excess cable length during displacement of the first drum from the first position to the second or a third position.

6. The apparatus according to claim 5 wherein the guide means have been arranged such that during the displacement combined with the rotation of the first drum, every point on the first drum describes a path which lies in a cylindrical surface around a vertical axis and which, if the cylindrical surface is rolled out into a flat surface, corresponds with an arc (c) with a radius (R) which is a function of the angle ($\phi$) and the distance (H) over which the rotation and the displacement respectively take place and of the diameter (D) of said cylindrical surface.

7. The apparatus according to claim 1 wherein said first drum comprises means for being engaged by external pulling means ($P_1$) by which at least said first drum can be pulled from the first position into the second position.

8. The apparatus according to claim 1 wherein the container comprises two compartments separated from each other by a dividing wall of which a first compartment encloses the first drum and of which the second compartment comprises said one inlet for the introduction of one or more cables into the second compartment, and the dividing wall comprises passages for feeding of the one or more cables from the second to the first compartment, which passages are positioned such that a fed-through cable comes out directly in the hollow interspace of the first drum containing the connection means on which the fed-through cable has been terminated.

9. The apparatus according to claim 8 wherein for said first drum the container in the first compartment comprises a hollow-walled cylindrical ring, concentric with the central axis, and attached at one side to the dividing wall and extending with an other, open side into the hollow interspace of said first drum, in such a way that at least in the first position of the first drum, the excess lengths of the cables terminated in the first drum lie within the hollow-walled ring.

10. The apparatus according to claim 1 wherein the container comprises cable guide tubes through which cables terminated or to be terminated on the connection means are guided from said one inlet to the connection means.

11. The apparatus according to claim 1 wherein the container has been positioned at least partly underground with a substantially vertical direction of displacement of the first drum, with the second position of the first drum corresponding to an at least partly above-ground position.

12. The apparatus according to claim 2 wherein excess length of cables terminated on the connection means of said one drum lies in the hollow interspace between the inner and outer walls of said one drum when said one drum occupies the first position.

13. The apparatus according to claim 12 wherein in the first position of said one drum at least part of the excess length of the cables lies wound around the cylindrical inner wall of said one drum, and guide means are provided which have been arranged such that the displacement of said one drum directed substantially along the central axis is combined with a rotation about the central axis, said rotation having a direction which is opposed to the winding direction of the excess cable length during displacement of said one drum from the first position to the second or a third position.

14. The apparatus according to claim 12 wherein the guide means have been arranged such that during the displacement combined with rotation of the first drum, every point on the first drum describes a path which lies in a cylindrical surface around a vertical axis and which, if the cylindrical surface is rolled out into a flat surface, corresponds with an arc (c) with a radius (R) which is a function of the angle ($\phi$) and the distance (H) over which the rotation and the displacement respectively take place and of the diameter (D) of said cylindrical surface.

15. The apparatus according to claim 3 wherein excess length of cables terminated on the connection means of a drum lies in the hollow interspace between the inner and outer walls of the first drum when said first drum occupies the first position.

16. The apparatus according to claim 15 wherein in the first position of the first drum at least part of the excess length of the cables lies wound around the cylindrical inner wall of the first drum, and guide means are provided which have been arranged such that the displacement of the first drum directed substantially along the central axis is combined with a rotation about the central axis, said rotation having a direction which is opposed to the winding direction of the excess cable length during displacement of the first drum from the first position to the second or a third position.

17. The apparatus according to claim 16 wherein the guide means have been arranged such that during the displacement combined with rotation of the first drum, every point on the first drum describes a path which lies in a cylindrical surface around a vertical axis and which, if the cylindrical surface is rolled out into a flat surface, corresponds with an arc (c) with a radius (R) which is a function of the angle ($\phi$) and the distance (H) over which the rotation and the displacement respectively take place and of the diameter (D) of said cylindrical surface.

18. The apparatus according to claim 3 wherein a given one of said first and further drums comprises means for being engaged by external pulling means ($P_1$) by which said given one drum can be pulled from the first position into the second or third position.

19. The apparatus according to claim 2 wherein the container comprises two compartments separated from each other by a dividing wall, of which a first compartment encloses the first and further drums, and of which the second compartment comprises said one inlet for the introduction of one or more cables into the second compartment, and the dividing wall comprises passages for feeding of the one or more cables from the second to the first compartment, which passages are positioned such that a fed-through cable comes out directly in the hollow interspace of a drum in said first and further drums and containing the connection means on which the fed-through cable has been terminated.

20. The apparatus according to claim 3 wherein the container comprises two compartments separated from each other by a dividing wall, of which a first compartment encloses the first and further drums, and of which the second compartment comprises said one inlet for the introduction of one or more cables into the second compartment, and the dividing wall comprises passages for feeding of the one or more cables from the second to the first compartment, which passages are positioned such that a fed-through cable comes out directly in the hollow interspace of a drum in said first and further drums containing the connection means on which the fed-through cable has been terminated.

21. The apparatus according to claim 4 wherein the container comprises two compartments separated from each other by a dividing wall, of which a first compartment encloses the first and further drums, and of which the second compartment comprises said one inlet for the introduction of one or more cables into the second compartment, and the dividing wall comprises passages for feeding of the one or more cables from the second to the first compartment, which passages are positioned such that a fed-through cable comes out directly in the hollow interspace of a drum in said first and further drums containing the connection means on which the fed-through cable has been terminated.

22. The apparatus according to claim 21 wherein for each one of said first and further drums the container in the first compartment comprises a hollow-walled cylindrical ring, concentric with the central axis, and attached at one side to the dividing wall and extending with an other, open side into the hollow interspace of said each one drum, in such a way that at least in the first position of said each one drum, the excess lengths of the cables terminated in said each one drum lie within the hollow-walled ring.

23. The apparatus according to claim 5 wherein the container comprises two compartments separated from each other by a dividing wall, of which a first compartment encloses the first and further drums, and of which the second compartment comprises said one inlet for the introduction of one or more cables into the second compartment, and the dividing wall comprises passages for the feeding of the one or more cables from the second to the first compartment, which passages are positioned such that a fed-through cable comes out directly in the hollow interspace of a drum in said first and further drums containing the connection means on which the fed-through cable has been terminated.

24. The apparatus according to claim 23 wherein for each one of said first and further drums the container in the first compartment comprises a hollow-walled cylindrical ring, concentric with the central axis, and attached at one side to the dividing wall and extending with an other, open side into the hollow interspace of said each one drum, in such a way that at least in the first position of said each one drum, the excess lengths of the cables terminated in said each one drum lie within the hollow-walled ring.

25. The apparatus according to claim 6 wherein the container comprises two compartments separated from each other by a dividing wall, of which a first compartment encloses the first and further drums, and of which the second compartment comprises said one inlet for the introduction of one or more cables into the second compartment, and the dividing wall comprises passages for feeding of the one or more cables from the second to the first compartment, which passages are positioned such that a fed-through cable comes out directly in the hollow interspace of a drum in said first and further drums containing the connection means on which the fed-through cable has been terminated.

26. The apparatus according to claim 25, wherein for each one of said first and further drums the container in the first compartment comprises a hollow-walled cylindrical ring, concentric with the central axis, and attached at one side to the dividing wall and extending with an other, open side into the hollow interspace of said each one drum, in such a way that at least in the first position of said each one drum, the excess lengths of the cables terminated in said each one drum lie within the hollow-walled ring.

27. The apparatus according to claim 2 wherein the container comprises cable guide tubes through which cables terminated or to be terminated on the connection means are guided from said one inlet to the connection means.

28. The apparatus according to claim 3 wherein the container comprises cable guide tubes through which cables terminated or to be terminated on the connection means are guided from said one inlet to the connection means.

29. The apparatus according to claim 4 wherein the container comprises cable guide tubes through which cables terminated or to be terminated on the connection means are guided from the said one inlet to the connection means.

30. The apparatus according to claim 5 wherein the container comprises cable guide tubes through which cables terminated or to be terminated on the connection means are guided from said one inlet to the connection means.

31. The apparatus according to claim 6 wherein the container comprises cable guide tubes through which cables terminated or to be terminated on the connection means are guided from said inlet to the connection means.

\* \* \* \* \*